United States Patent [19]
Andrejasich et al.

[11] Patent Number: 5,375,454
[45] Date of Patent: Dec. 27, 1994

[54] PROGRAMMABLE PUMP CONTROLLER

[75] Inventors: Raymond J. Andrejasich, Carmel; Roy E. Kidd, Clayton, both of Ind.

[73] Assignee: Emerson Electric Co., St. Louis, Mo.

[21] Appl. No.: 30,988

[22] Filed: Mar. 12, 1993

[51] Int. Cl.⁵ .............................................. G01M 3/16
[52] U.S. Cl. .................. 73/40.5 R; 222/52; 364/558
[58] Field of Search ............ 364/558; 222/52; 73/40.5 R

[56] References Cited

U.S. PATENT DOCUMENTS

| | | | |
|---|---|---|---|
| 4,586,033 | 4/1986 | Andrejasich et al. | 340/603 |
| 4,644,354 | 2/1987 | Kidd | 73/49.2 X |
| 4,658,986 | 4/1987 | Freed et al. | 222/52 |
| 4,721,950 | 1/1988 | Andrejasich et al. | 340/603 |
| 4,736,193 | 4/1988 | Slocum et al. | 340/522 |
| 4,835,522 | 5/1989 | Andrejasich et al. | 340/521 |
| 4,835,717 | 5/1989 | Michel et al. | 364/558 |
| 4,855,714 | 8/1989 | Clarkson et al. | 340/521 |
| 4,876,530 | 10/1989 | Hill et al. | 340/605 |
| 4,947,352 | 8/1990 | Jenkins | 364/558 |
| 5,086,403 | 2/1992 | Slocum et al. | 364/558 |
| 5,103,410 | 4/1992 | Slocum et al. | 364/558 |

OTHER PUBLICATIONS

Installation And Operation Instructions Pollulert Control Box FD406. May 18, 1992.
E.P.A. Regulation AO C.F.R. 280.40–280.45.

*Primary Examiner*—Thomas P. Noland
*Assistant Examiner*—Joseph W. Roskos
*Attorney, Agent, or Firm*—Robert F. Meyer; Eric R. Waldkoetter

[57] ABSTRACT

A microprocessor controlled timer is installed in a petroleum service station product dispensing system that includes a pump relay, a pump, a dispenser, and a leak detection monitor. The timer activates pump relays to pressurize a liquid product line that runs from a tank to the dispenser at predetermined intervals to compensate for thermal contraction during product line leakage testing. Prior to activating pump relays, the timer has circuitry to determines if product is currently being dispensed. If product is being dispensed, the timer waits until dispensing has halted before activating pump relays to pressurize the product line. Also prior to activating pump relays, the timer has circuitry to determine if pump operation should be inhibited and if so halts before activating pump relays. Optical isolation is used between the timer and pump relays and a dispenser switch.

13 Claims, 9 Drawing Sheets

PROGRAMMABLE PUMP CONTROLLER

BACKGROUND

This invention relates to a hydrocarbon leak detection system used to test for leaks in a liquid product line. More specifically, this invention controls a pump to pressurize a liquid product line to compensate for thermally induced pressure changes during a product line leak test.

A typical use for a hydrocarbon product dispensing line pressure probe is in a vehicular service station that dispenses fuel. In a vehicular service station, it is common for fuel to be stored in large underground storage tanks and pumped through a product dispensing line to a dispenser. The dispenser typically has a switch that is turned on by a customer when fuel is dispensed into a vehicle. When the customer has completed dispensing fuel, the dispensing switch is turned off which also turns off the pump. A check valve in the product dispensing line prevents fuel from draining out of the product dispensing line when the pump is turned off and maintains the product under pressure in the product dispensing line. A pressure relief valve built into the pump reduces product line pressure to about 11–15 pounds per square inch PSI (159.5–217.5 Bar) after the dispensing switch is turned off.

The product dispensing line also has a line pressure probe installed in a "T" connection in the product dispensing line for sensing product line pressure. In the past, line pressure probes have been designed to detect large scale leaks on the order of three (3) or more gallons (11.36 or more liters) per hour. When detecting large scale leaks, thermally induced pressure variations are relatively insignificant.

Recently, the Environmental Protection Agency (E.P.A.) has required that small scale leaks measured in fractions of a gallon (liter) must be detectable in product dispensing lines. The Environmental Protection Agency (E.P.A.) requires either an annual line tightness test with a required detection rate of "0.1 gallon per hour [0.379 liters] leak rate at one and one-half times the operating pressure," 40 C.F.R. § 280.44 (b) (1988), or a monthly line tightness test with a required detection rate of "0.2 gallon per hour [0.757 liters] leak rate or a release of 150 gallons [567.75 liters] within a month with a probability of detection of 0.95 and a probability of false alarm of 0.05." 40 C.F.R. § 280.43 (h) (l) (1988).

With the E.P.A. mandated line tightness test standards, thermally induced pressure variations became significant, and there was a need to distinguish between thermally induced pressure changes and an actual product dispensing line leak.

Some previous hydrocarbon leak detection systems, such as that described in U.S. Pat. No. 4,835,717, have employed a resistive thermal device, Such as a thermistor, to sense product temperature in an effort to compensate for thermally induced pressure changes. Use of a resistive thermal device can create inaccuracies because product temperature is only measured at one location, and product temperature can vary many degrees over the length of a product line.

Some previous hydrocarbon leak detection systems, such as that described in U.S. Pat. No. 4,876,530, have employed a spring loaded piston to operate in a fluid reservoir to supply make up fluid in the event of volume loss by thermal contraction when the pump is off. The pump is operated when the spring loaded piston can no longer supply make up fluid to keep a product line pressurized. Using a piston and reservoir to maintain product line pressure within a predetermined range, generally requires underground product line modifications and the addition of mechanical components that can fail.

What is needed is a programmable pump controller with the capability to determine if product is being dispensed and timed to briefly jog the pump at predetermined intervals to repressurize a product line to compensate for the pressure drop due to thermal contraction to decrease false alarms during a line tightness test.

SUMMARY

The present invention is directed to an apparatus and method that satisfies the need for a programmable pump controller to pressurize a liquid product line while the product becomes thermally stable.

We have invented an apparatus for thermally stabilizing a product dispensing line by briefly jogging a pump at predetermined intervals to repressurize the product line to compensate for thermal contraction. A programmable pump controller having features of the present invention comprises the following. A microprocessor circuit that is programmed to operate a dispensing pump to pressurize the liquid product line as part of a leak detection sequence. A pump relay circuit placed in parallel with a dispenser switch for operating the pump in response to the microprocessor circuit. A pump sensing circuit for determining if the pump is being operated by the dispenser. The pump sensing circuit further includes an AC voltage sensing circuit placed in parallel with the dispensing switch for determining when the pump is being operated by the dispenser, and an isolation circuit to convert an AC input from the AC voltage sensing circuit to DC and to isolate the AC voltage sensing circuit from the microprocessor circuit.

We have also invented a method for thermally stabilizing a product dispensing line by briefly jogging a pump at predetermined intervals to repressurize the product line to compensate for thermal contraction. The method for pressurizing a liquid product line for leak detection comprises the following. A microprocessor circuit programmed to operate a dispensing pump to pressurize a liquid product line as part of a leak detection sequence is provided. A pump relay circuit placed in parallel with a dispenser switch for operating the pump in response to the microprocessor circuit is provided. A pump sensing circuit for determining if the pump is operating is provided. The pump sensing circuit generates a logic level when the dispensing switch is "on" and another logic level when the dispensing switch is "off" as an input to the microprocessor circuit.

The following are objects of the programmable pump controller. Prior to beginning product line thermal stabilization, determine if the pump is being2operated by the dispenser to prevent interference because of customers dispensing product. Inhibit operation of the dispensing pump by the programmable pump controller when desired such as when product inventory is being measured. Provide electrical isolation between the programmable pump controller and the pump relay to eliminate the need for separate electrical isolation.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE DRAWINGS

Figure 1:
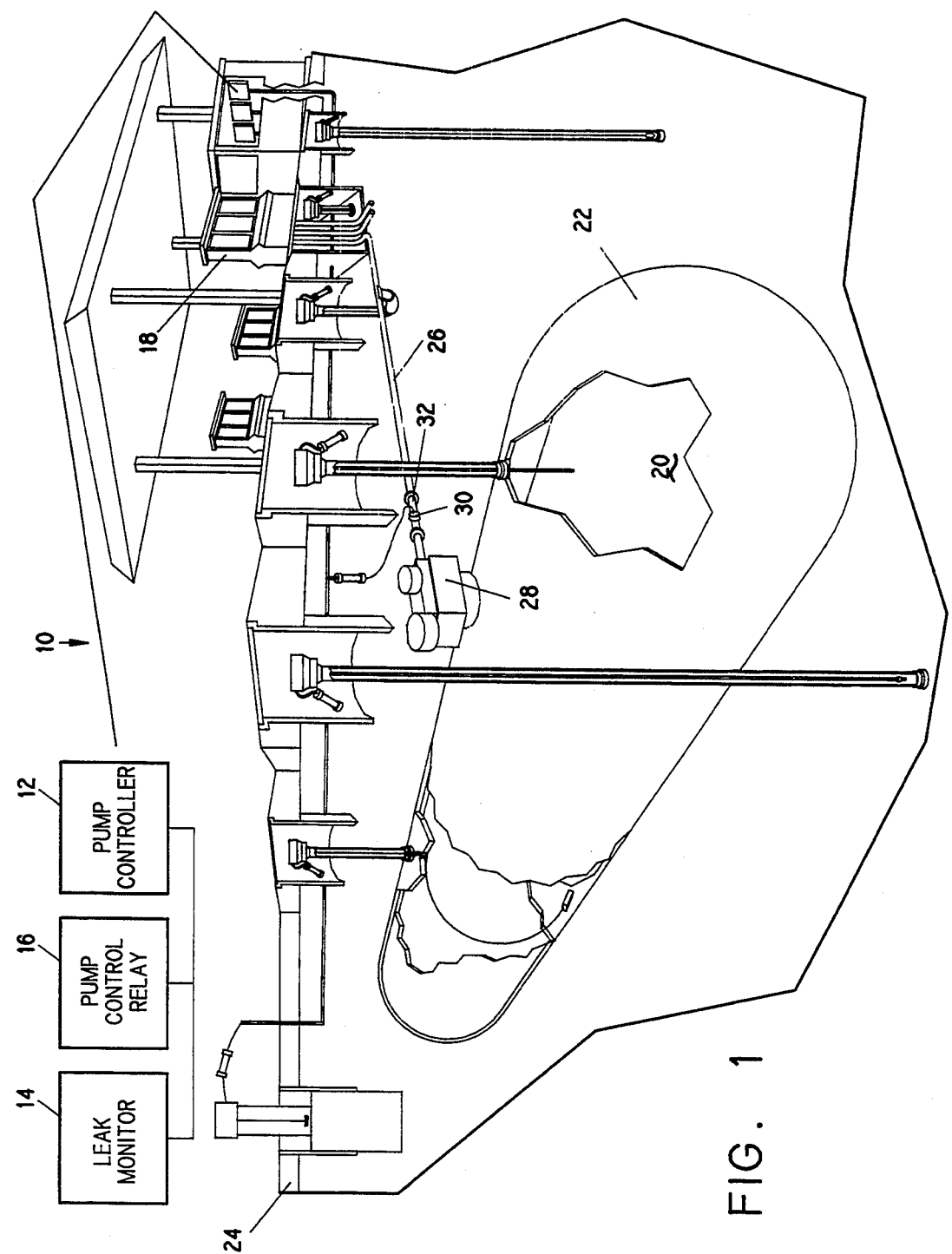
FIG. 1 shows an installed leak detection system.

The pump controller 12 is a component of a hydrocarbon leak detection system 10 such as shown in FIG. 1. The pump controller 12 is connected to a leak detection controller 14, a pump controller relay 16, and a dispenser 18.

Figure 2:
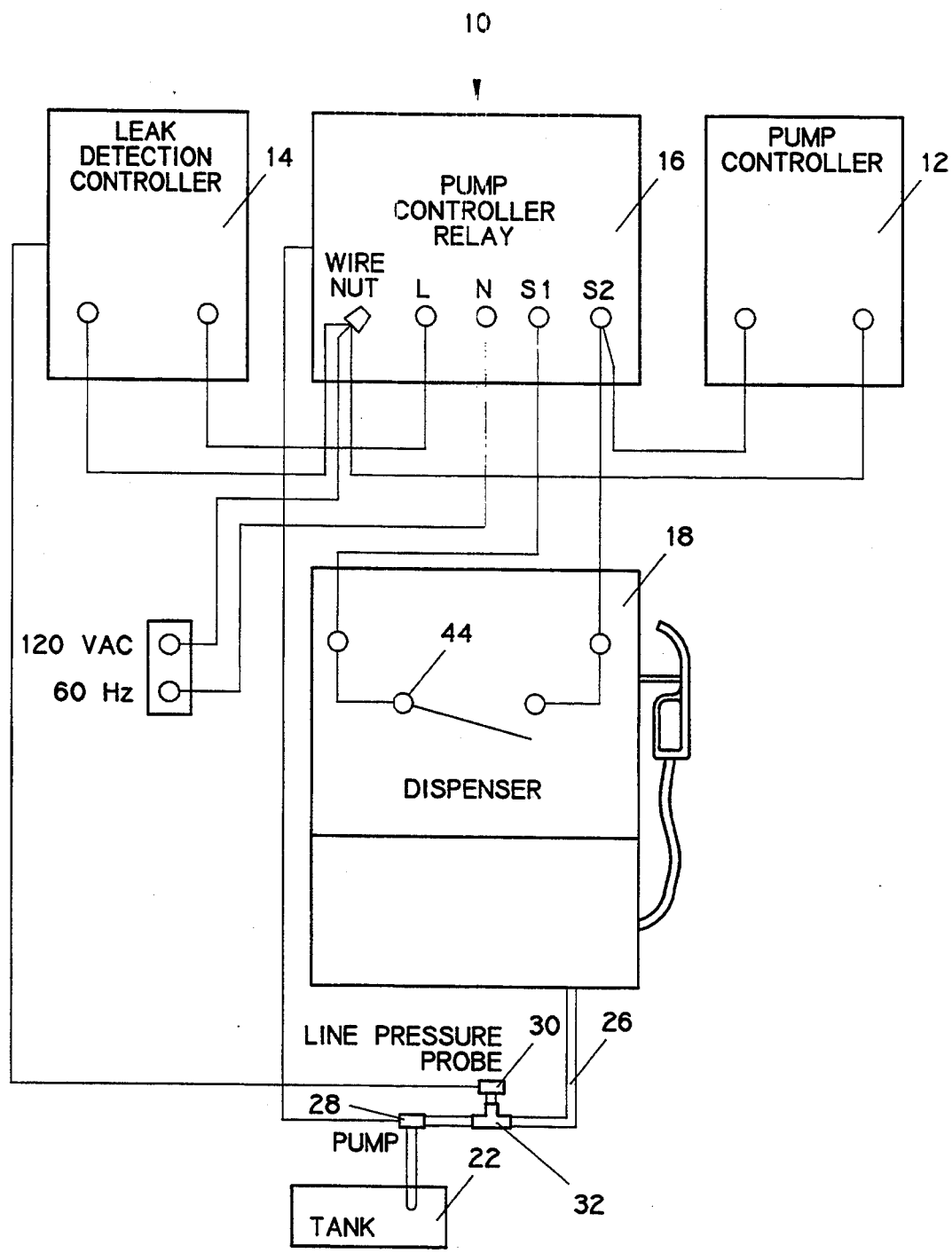
FIG. 2 shows a pump controller wired to other components of the leak detection system.

Referring to FIGS. 1 and 2, an overview of a typical hydrocarbon leak detection system 10 of the type commonly found in fuel service stations is described. The fuel 20 is stored in a underground storage tank 22 which is typically buried beneath a concrete slab 24. A product line 26 extends from the underground tank 22 to a dispenser 18 which is mounted on the slab 24. A submersible pump 28, such as a Red Jacket ® Electronics petroleum pump part no. P75S1 available from The Marley Pump Co., 5800 Foxridge Dr., 66202, P.O. Box 2973, Mission, Kans. 66202. The pump 28 is operated by a pump controller relay 16, such as a Red Jacket ® Electronics pump controller relay part no. 880030, to pump the fuel 20 through the product line 26 to the dispenser 18. A check valve (not shown) which is typically an internal component of the pump 28 prevents liquid from the product line 26 from draining back into the underground storage tank 22 when the pump 28 is turned "off".

Monitoring of pressure in a product line 26, such as a service station fuel dispensing pipe, can be accomplished with a pressure transducer or line pressure probe 30, such as that described in U.S. Pat. No. 4,835,717 which is hereby incorporated by reference, or Pollulert ® model no. FD202TDRA or FD203PSRA available from Pollulert ®, 2831 Waterfront Parkway East Drive, Indianapolis, Ind. 46214, is installed in a "T" connection 32 in the product line 26 for sensing product line pressure. The pressure probe 30 is wired to a leak detection controller 14 and provides an address signal over four (4) wires and a binary status signal over an additional three (3) wire data line (not shown) to the leak detection controller 14 to report product line 26 leak status. An eighth wire and associated shield wire (not shown) provide power to the line pressure probe 30.

The microprocessor based leak detection controller 14 such as that described in U.S. Pat. No. 4,736,193 which is hereby incorporated by reference or Pollulert ® model no. FD103LP, processes signals from line pressure probes 30 and other transducers in accordance with a computer program to determine and report the leak status of a fuel storage and distribution system.

Figure 3:
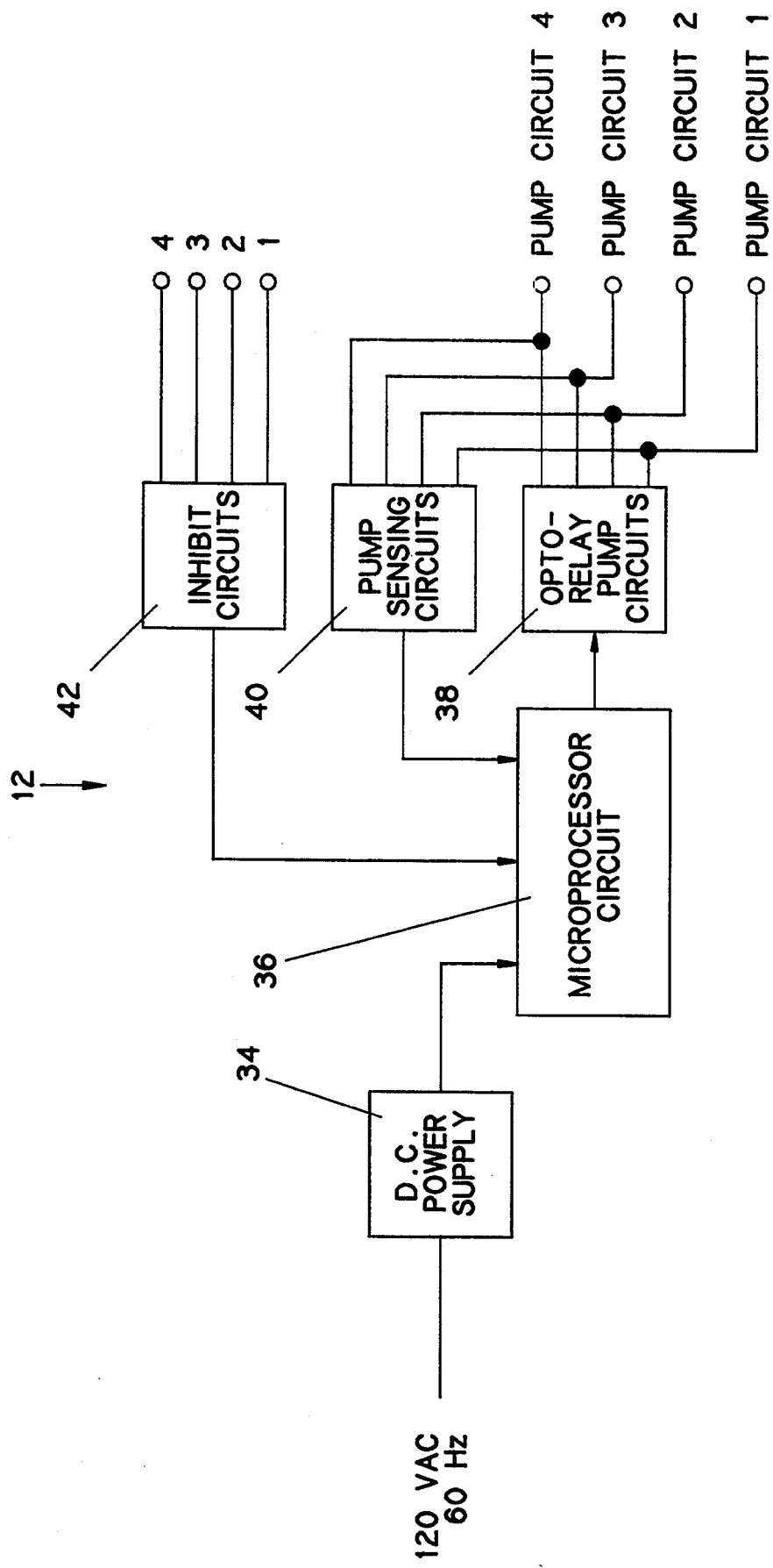
FIG. 3 shows a block diagram of the programmable pump controller.

Referring to FIG. 3, the pump controller 12 comprises a power supply 34, a microprocessor circuit 36, pump relay circuits 38, pump sensing circuits 40, and inhibit circuits 42. These circuits are arranged on a single printed circuit board (not shown) with the required Underwriters Laboratories ® shielding between circuits. The circuit board is mounted within a metal enclosure on four standoffs.

Figure 4:
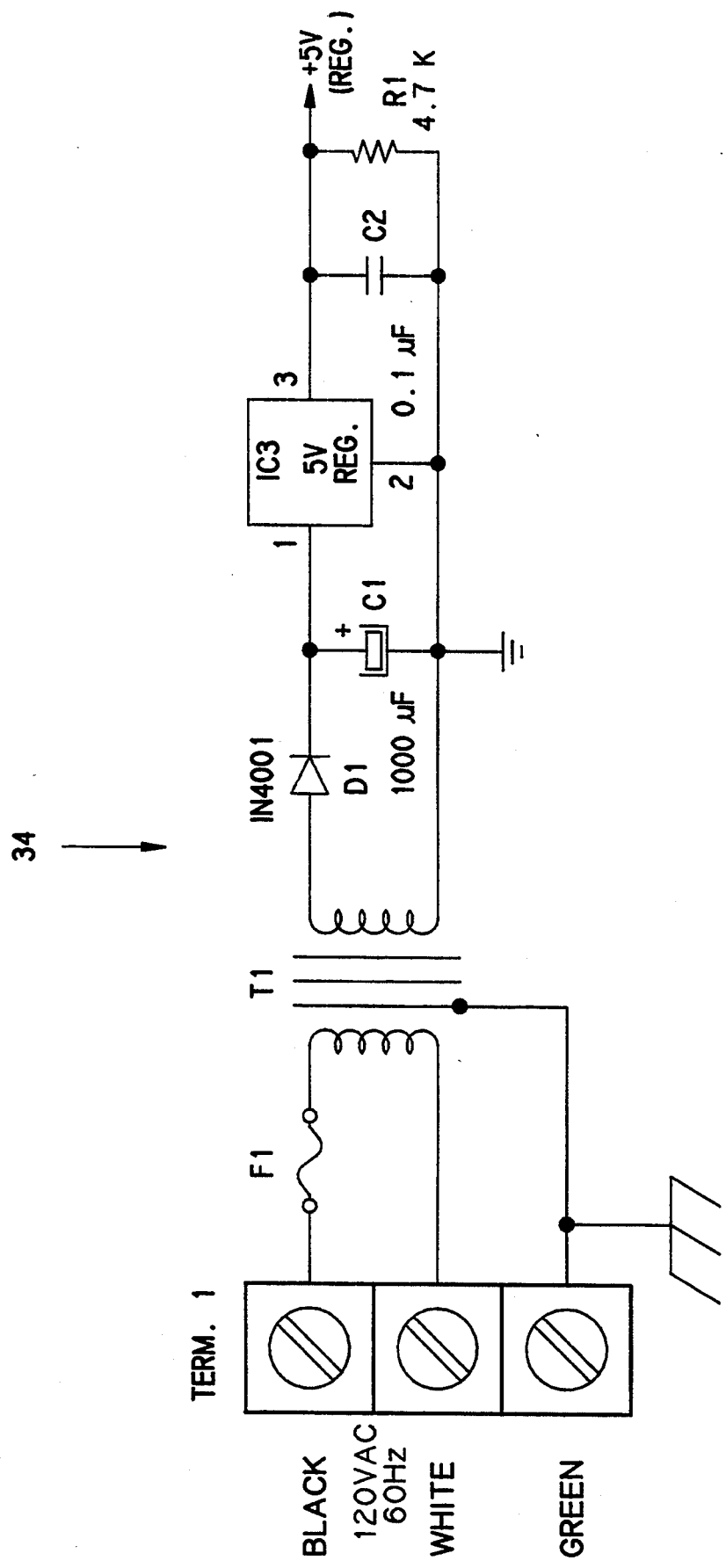
FIG. 4 shows a D.C. power supply.

Referring to FIG. 4, the power supply 34 comprises F1, T1, D1, C1, IC3, C2 and R1. The purpose of the power supply is to provide the required 5 VDC regulated voltage to pump controller 12 components.

Figure 5:
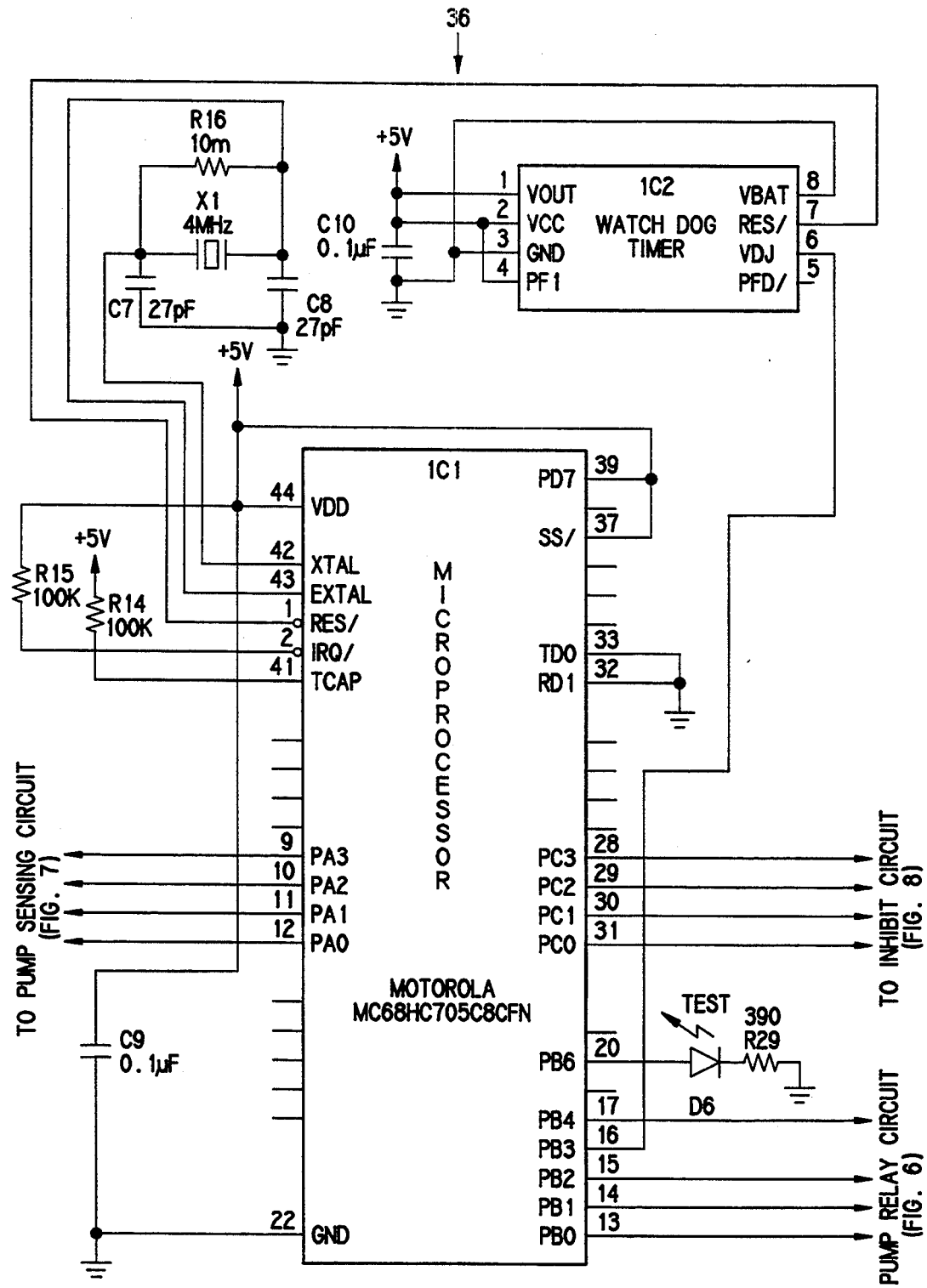
FIG. 5 shows a microprocessor circuit.

Referring to FIG. 5, the microprocessor circuit 36 comprises IC1, IC2, C9, R15, R14, C7, X1, R16, C8, C10, and a visual display circuit of R29, and D6. The purpose of the microprocessor circuit 36 provided is to operate a pump 28 (FIG. 2) to pressurize a liquid product line 26 (FIG. 2) as part of a leak detection test.

Integrated circuit IC1 is typically a Motorola microprocessor part no. MC68HC705C8CFN available from Motorola, Box 20912, Phoenix, Ariz. 85036, but there are many other microprocessors available that can perform the same processing.

Integrated circuit IC2 is a watchdog timer typically a Maxim part no. MAX690EPA, available from Maxim Integrated Products, 120 San Gabriel Drive, Sunnyvale, Calif. 94086-9892. Capacitor C10 further filters the power supply line to IC2. Watchdog timer IC2 will reset microprocessor IC1 if there is a momentary drop in the DC power supply 34, or other interruption in the normal program flow of the microprocessor IC1.

Capacitor C9 filters the power supplied to IC1 and resistors R14 and R15 cooperate to provide the correct voltage levels to IC1.

Quartz Crystal X1 is configured with resistor R16 and capacitors C7 and C8 to provide an external 4 MHz oscillator for the clock of microprocessor IC1.

The visual display circuit comprises LED D6 and resistor R29 which is connected to an output port PB6 on the microprocessor IC1. The purpose of the visual display circuit provided is to display the operational status of the programmable pump controller. The visual display circuit verifies power is being applied to the microprocessor IC1 and verifies the microprocessor IC1 clock is operational. LED D6 visually indicates when IC1 pin 20 goes high and resistor R29 limits current flow through D6. LED D6 is typically placed so it can be seen when the front cover of the programmable pump controller is opened.

Figure 6:
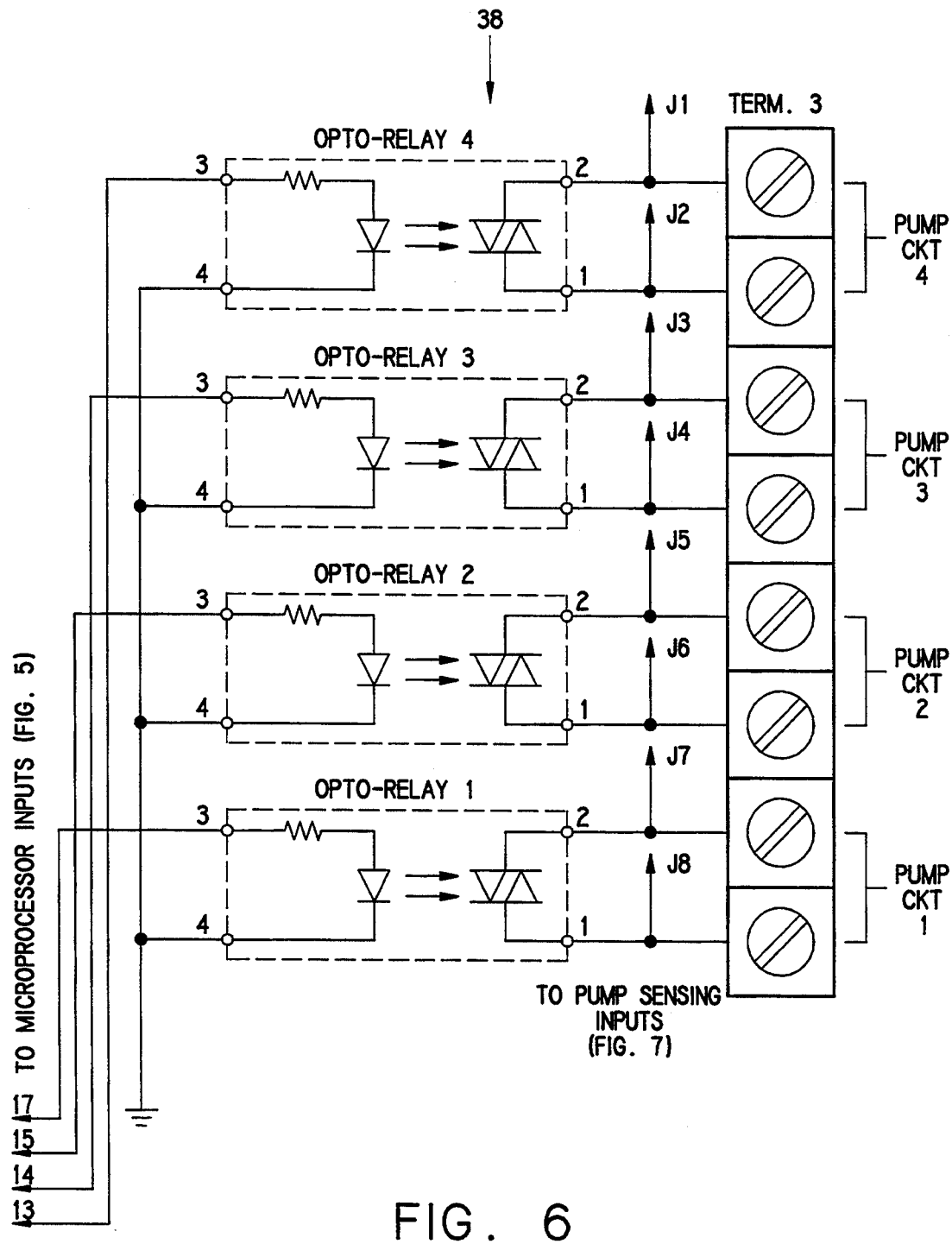
FIG. 6 shows pump relay circuits.

Referring to FIG. 6, pump relay circuits 38 are placed in parallel with a dispenser switch 44 (FIG. 2) and comprises optical relays OPTO-RELAY 1, 2, 3, and 4. The purpose of pump relay circuits 38 provided are to operate the pump 28 in response to the microprocessor circuit 36.

Each opto-relay, such as OPTO-RELAY 4, is typically a Grayhill part no. 70S2-04-B-03-V available from Grayhill, Inc., 561 Hillgrove Avenue, P.O. Box 10370, La Grange, Ill. 60525. Terminals labeled as pump circuits 1, 2, 3, and 4 can each be connected to a dispenser switch 44 (FIG. 2) to activate a pump controller relay 16 (FIG. 2) such as a Red Jacket model 880-029. The pump controller relay 16 load that pump circuits 1, 2, 3, and 4 energize is typically a Potter & Brumfield part no. PRD-7AGO available from Potter & Brumfield Inc., 200 South Richland Creek Drive, Princeton, Ind. 47671-0001. The pump controller 12 is in turn connected to a dispenser switch 44 which is in parallel with the pump controller relay 16. The pump controller relay 16 is in turn connect to a pump 28 such as a Red Jacket submersible pump model P33R1-P75S1.

Figure 7:
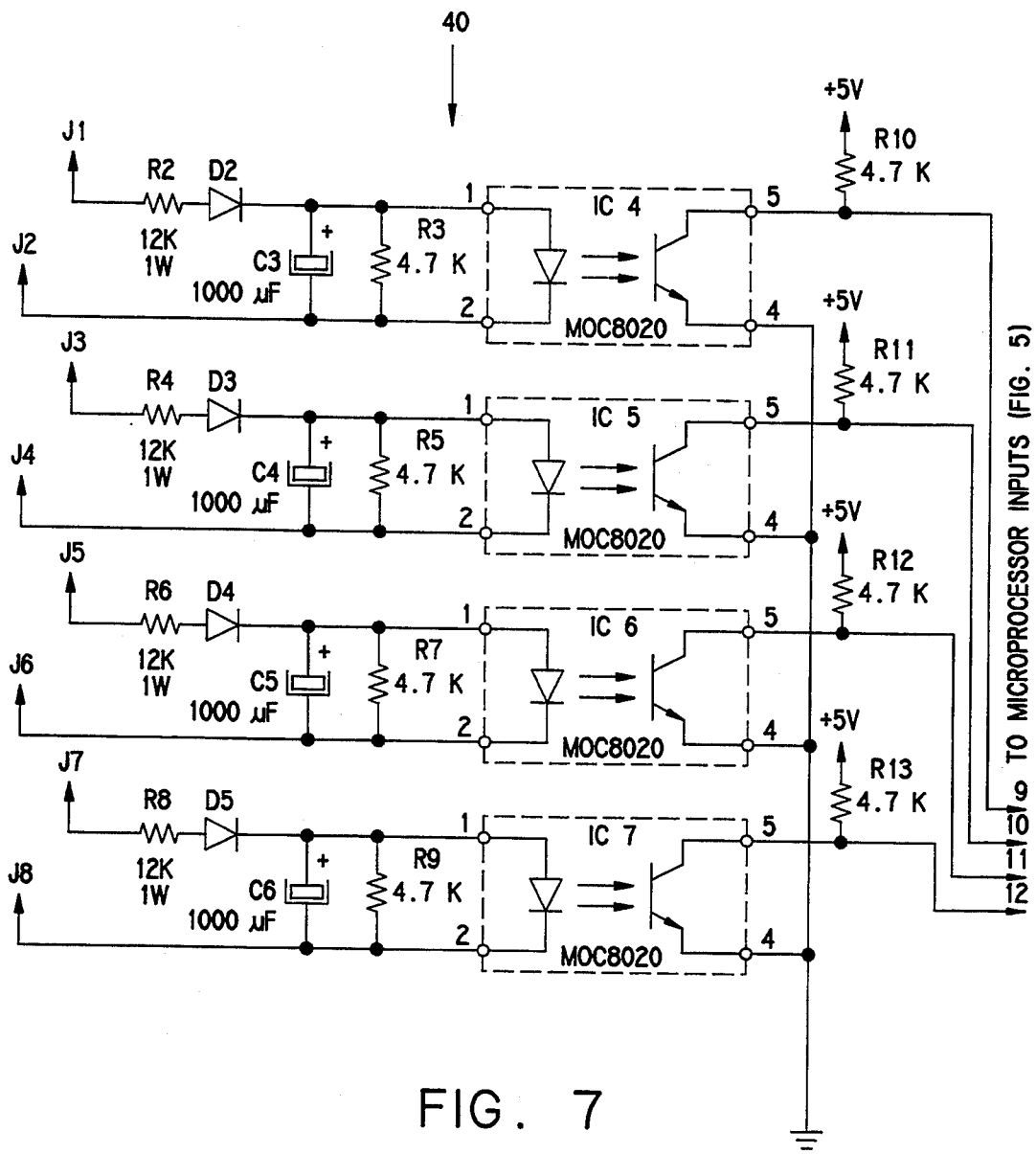
FIG. 7 shows pump sensing circuits.

Referring to FIG. 7, the sensing circuits 40 comprise integrated circuits IC4, IC5, IC6, and IC7; resistors R2, R3, R4, R5, R6, R7, R8, R9, R10, R11, R12, and R13; diodes D2, D3, D4, and D5; and, capacitors C3, C4, C5, and C6. The purpose of the sensing circuits 40 provided is to determine if the pump 28 is operating and generate a logic level when then pump 28 is "on" and another logic level when the pump 28 is "off" as an input to the microprocessor IC1. The logic level generated when the pump 28 is "on" is high and another logic level generated when the pump 28 is "off" is a low logic level. The pump 28 sensing circuits 40 are AC voltage sensing circuits 40 placed in parallel with the respective dispensing switch 44 and which provides AC to DC rectification.

Pump sensing circuits 40 uses integrated circuit, IC4, IC5, IC6, and IC7, which are opto-couplers to provide intrinsically safe isolation from the dispensing switch 44 and the pump controller relay 16. The opto-isolators are typically Motorola part no. MOC8020 Darlington optocoupler available from Motorola, Box 20912, Phoenix, Ariz. 85036. Opto-isolation can also be achieved with other techniques such as fiber optics.

The sensing circuits 40 provide four sensing input circuits that correspond with the four pump relay circuits shown in FIG. 7 to determine when the pump controller relay 16 has been activated. Additional sensing input circuits could be added. Inputs from opto-couplers IC4, IC5, IC6, and IC7 are connected to pump relay circuits 4, 3, 2, and 1, respectively. The operation of pump relay circuit 4 follows to show how a pump sensing circuit functions. The other sensing input circuits would function similarly with their respective pump relay circuit.

When the dispenser switch 44 (FIG. 2) related to the pump relay circuit 4 is "off," 120 VAC appears at the terminals of pump relay circuit 4. The 120 VAC at the terminals of pump relay circuit 4 is reduced by R2, rectified by D2 and filtered with C3. The resulting DC voltage on IC4 at pins 1 and 2 energizes the LED in the opto-coupler, IC4. When the LED in IC4 is energized, the opto-transistor in IC4 is turned "on" thus pulling down the voltage at IC4 pin 5 to about zero (0).

When the dispenser switch 44 (FIG. 2) related to the pump relay circuit 4 is "on," 120 VAC no longer appears at the terminals of pump relay circuit 4. Since there is little or no voltage appearing at the terminals of pump relay circuit 4, the LED in IC4 is no longer energized, so the opto-transistor in IC4 is turned "off" thus pulling the voltage of IC4 pin 5 to about 5 VDC, via pullup resistor R10. Thus, by logic the status of the respective submersible pump (FIG. 2) is transmitted to the microprocessor IC1 (FIG. 5), via ports PA3, PA2, PA1 and PA0.

Figure 8:
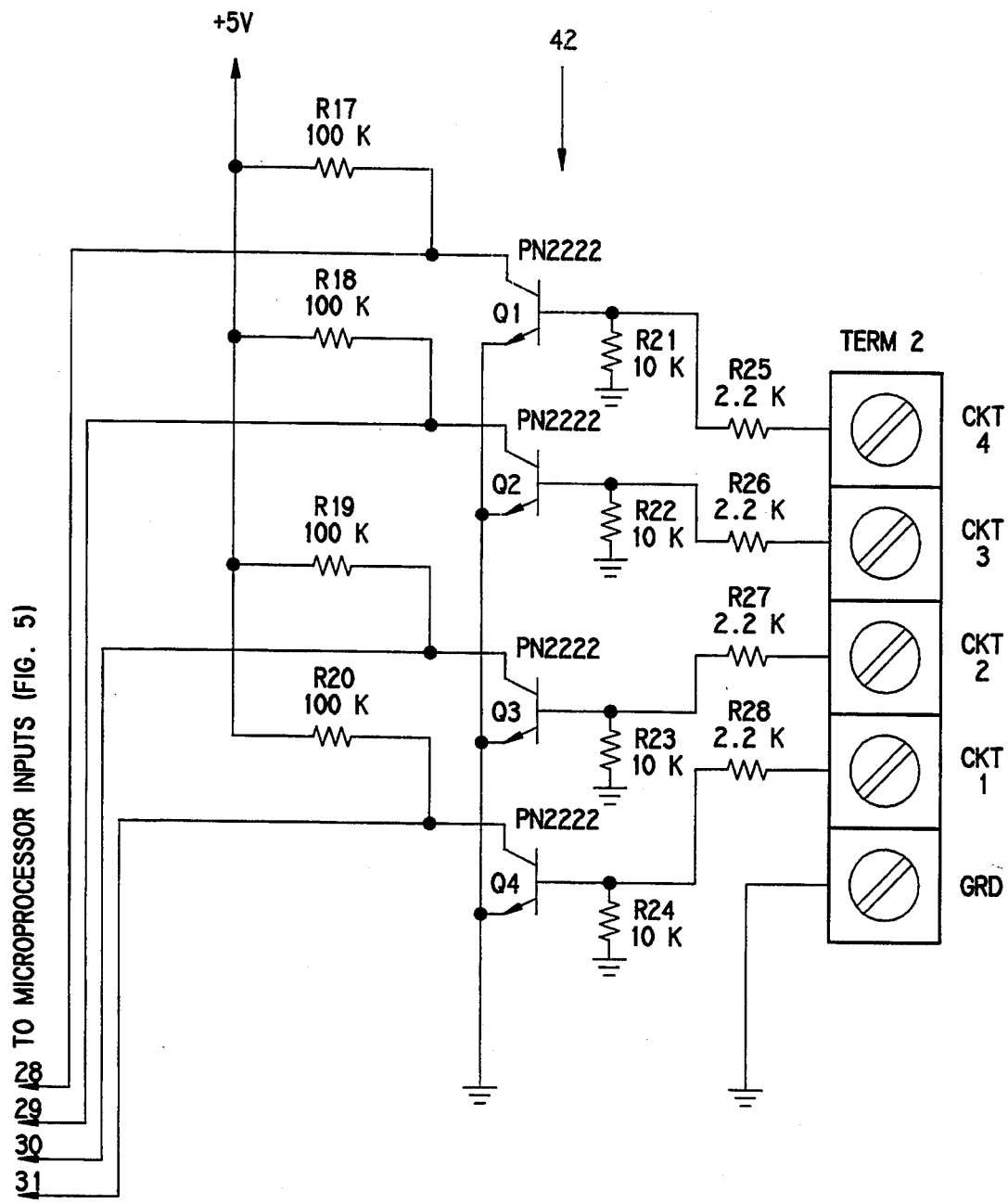
FIG. 8 shows inhibit circuits.

Referring to FIG. 8, the inhibit circuits 42 comprises transistors Q1, Q2, Q3, and Q4; and, resistors R17, R18, R19, R20, R21, R22, R23, R24, R25, R26, R27, and R28. The purpose of the inhibit circuits 42 is to prevent operation of the pump 28 (FIG. 2) by the leak detection controller 14 during a programmed leak detection sequence by another system (not shown). This is accomplished when a 5 VDC TTL voltage is applied to inhibit circuits 42 inputs 1, 2, 3, or 4. Inhibit circuits 42 inputs are typically connected to a point-of-sale terminal (not shown), so the point-of-sale terminal can provide the 5 VDC TTL voltage to prevent operation of the dispensing pump 28 (FIG. 2) by the pump controller 12 (FIG. 2). The pump controller 12 (FIG. 2) is typically inhibited during product inventory when measurements of product in a storage tank 22 (FIG. 2) is taking place. Transistors Q1, Q2, Q3, and Q4 are each typically a National Semiconductor PN2222 or equivalent. Resistors R25, R26, R27, and R28 limit current to the bases of transistors. Q1, Q2, Q3, and Q4, respectively. Resistors R21, R22, R23, and R24 bias the bases of transistors Q1, Q2, Q3, and Q4, respectively. Resistors R17, R18, R19, and R20 are pull-up resistors and also limit collector current flow through transistors Q1, Q2, Q3, and Q4, respectively, when the transistors are turned "on" by the inhibit voltage. When the transistors are "on" a low logic level is provided to microprocessor IC1 (FIG. 5) via ports PC0, PC1, PC2, and PC3. When the transistors are "off" the pull-up resistors provide a high logic level.

Inhibit circuits 42, 1, 2, 3, and 4 are activated to inhibit operation of the pump controller 12 (FIG. 2) when 5 VDC TTL voltage is applied to any or all of the inhibit circuit inputs 1, 2, 3, or 4.

Figure 9:
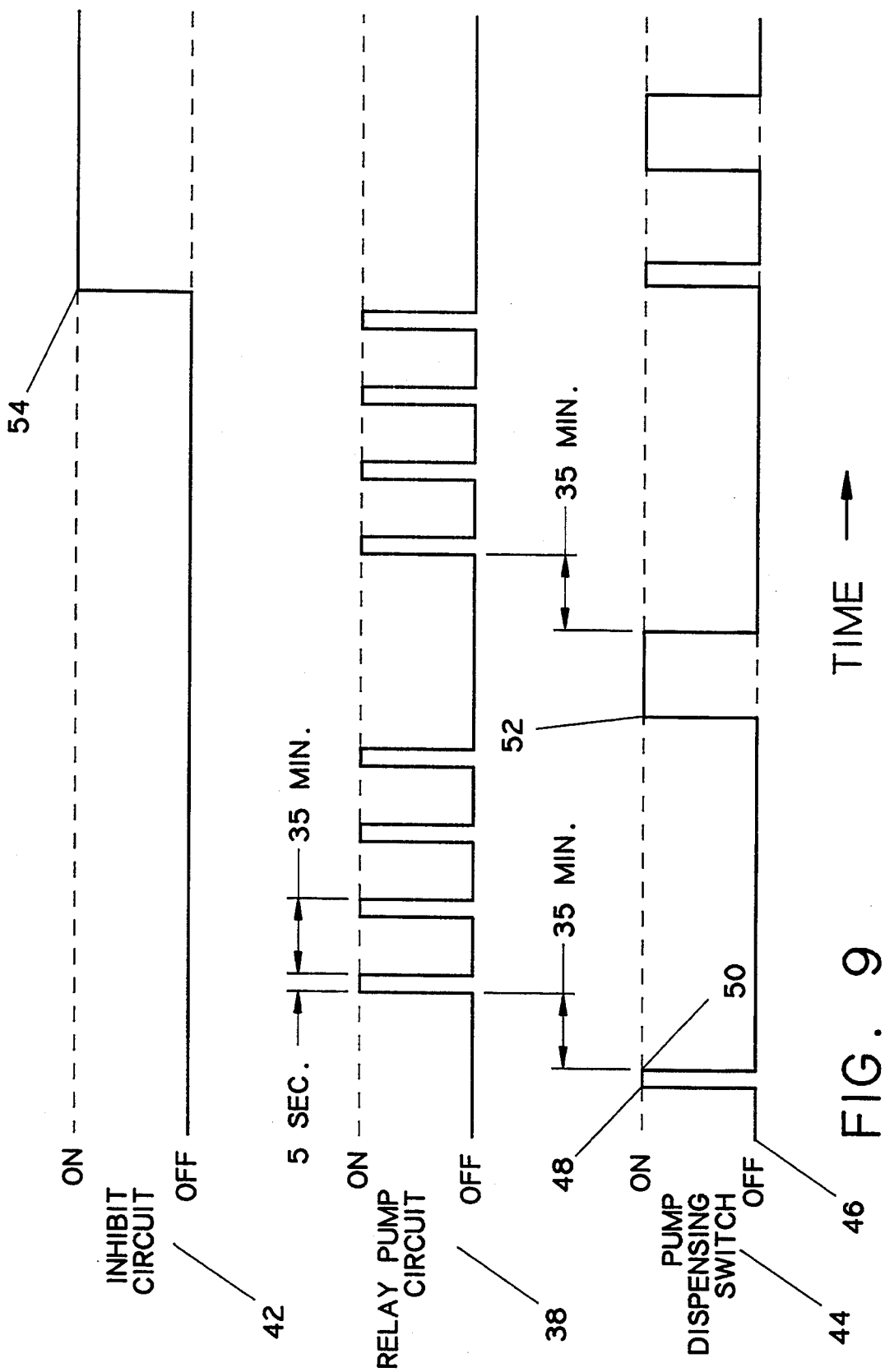
FIG. 9 shows a programmable pump controller timing diagram.

Operation of the programmable pump controller is now described. Referring to FIGS. 3 and 9, the pump controller 12 timing diagram represents the interrelationship of one of four (4) channels of the inhibit circuits 42, the pump relay circuits 38, and the pump sensing circuits 40 and as acted upon by the microprocessor circuit 36.

Initially 46, when none of the dispensing pumps are operational, there is no activity in the pump relay circuit 38 because a product dispense has not initiated a line tightness test.

As soon as product is dispensed as detected by the pump sensing circuits 40, the pump sensing circuit 40 watches for the completion of the product dispensing cycle 50 which is then communicated to the microprocessor circuit 36. Upon communication of completion of the product dispensing cycle 50 to the microprocessor circuit 36, the internal timer is initiated in the microprocessor circuit 36. The internal timer times out for a period of about thirty-five (35) minutes to permit product in the dispensing line to thermally stabilize.

After the thirty-five (35) minutes have expired, and before the product line pressure become zero (0), the pump relay circuits 38 is activated 51 by the microprocessor circuit 36 for a period of about five (5) seconds to repressurize the product line with additional product if thermal contraction has occurred. If thermal expansion has occurred, although the pump relay circuits 38 still activates 51 the pump 28 (FIG. 1) for about five (5) seconds, the check valve which is integral to the pump 28 (FIG. 1) will prevent additional product from entering the product line 26 (FIG. 1).

After the pump 28 (FIG. 1) has been operated for about (5) seconds, the internal timer in the microprocessor circuit 36 will again time out for about thirty-five (35) minutes after which the pump relay circuits 38 will again jog the pump 28 (FIG. 1). The sequence will repeat itself until the completion of a number of cycles to permit thermal stabilization to occur in order to complete a line tightness test.

But if the pump sensing circuit 40 detects product being dispensed prior to completion of the number of cycles to permit thermal stabilization, then the line tightness test is aborted. The programmable pump controller 12 will then wait for the pump sensing circuit 40 to detect that product has again been dispensed before resetting the internal timer of the microprocessor circuit 36 to initiate a new cycle. The programmable pump controller 12 sequence will continue until a line tightness test has been completed.

If the inhibit feature is enabled, the microprocessor circuit 36 will ignore inputs from the pump sensing circuit 40.

The previously described versions of the present invention have many advantages, including: providing a programmable pump controller that cooperates with existing equipment to thermally stabilize a product line.

Although the present invention has been described in considerable detail with reference to certain preferred versions thereof, other versions are possible. For example, referring to FIG. 3, the programmable pump controller 12 could be configured to have more than four (4) pump sensing circuits 40 and pump relay circuits 38 to accommodate facilities with more than four (4) underground tanks 22 (FIG. 1). Additionally, inhibit circuits 42 that can correspond with each pump relay circuit 38 provide an optional feature to inhibit pump operation when desired. The programmable pump controller 12 can operate without inhibit circuits 42.

The programmable pump controller 12 could be configured to accept an input from a transducer such as a line pressure probe 30 (FIG. 2) to provide additional information to the microprocessor circuit 36 to vary the number or length of cycles to permit product line 26 (FIG. 2) thermal stabilization based upon product line 26 (FIG. 2) conditions.

The programmable pump controller 12 could have all components except the pump relay circuits 38 placed within a line pressure probe 30 (FIG. 1). The line pressure probe 30 (FIG. 1) would have an electrically isolated or fiber optic connection to the pump relay circuits 38 which would be located in non-hazardous area, away from the product storage tank 22 (FIG. 1) in a place such as a service station building.

Therefore, the spirit and scope of the appended claims should not be limited to the description of the preferred versions contained herein.

What is claimed is:

1. A programmable pump controller to pressurize a liquid product line for leak detection, comprising:
   (a) a microprocessor circuit that is programmed to operate a dispensing pump to pressurize the liquid product line as part of a leak detection sequence;
   (b) a pump relay circuit placed in parallel with a dispenser switch for operating the dispensing pump in response to the microprocessor circuit; and,
   (c) a pump sensing circuit for determining if the dispensing pump is being operated by the dispenser wherein the pump sensing circuit comprises an AC voltage sensing circuit placed in parallel with the dispensing switch for determining when the pump is being operated by the dispenser, and an isolation circuit to convert an AC input from the AC voltage sensing circuit to DC and to isolate the AC voltage sensing circuit from the microprocessor circuit.

2. The programmable pump controller as recited in claim 1, further comprising:
   (d) an inhibit circuit for preventing operation of a product dispensing pump by the programmable pump controller during a programmed monitoring sequence by another system.

3. The programmable pump controller as recited in claim 1, further comprising:
   (e) a visual verification circuit for displaying the operational status of the programmable pump controller.

4. The programmable pump controller as recited in claim 1 wherein the AC voltage sensing circuit, comprises: a protection circuit for reducing excessive voltage to the voltage filter if an isolation circuit fails.

5. The programmable pump controller as recited in claim 1 wherein the isolation circuit is an opto-coupler.

6. The programmable pump controller as recited in claim 1 wherein the pump sensing circuit generates a logic level when the pump is "on" and another logic level when the dispensing switch is "off" as an input to the microprocessor circuit.

7. The programmable pump controller as recited in claim 6 wherein the pump sensing circuit generates a high logic level when the pump is "on" and a low logic level when the pump is "off".

8. A method of pressurizing a liquid product line for leak detection, comprising the steps of:
   (a) providing a microprocessor circuit that is programmed to operate a dispensing pump to pressurize the liquid product line as pan of a leak detection sequence;
   (b) providing a pump relay circuit placed in parallel with a dispenser switch for operating the pump in response to the microprocessor circuit;
   (c) providing a pump sensing circuit for determining if the pump is operating wherein the pump sensing circuit comprises an AC voltage sensing circuit placed in parallel with the dispensing switch for determining when the pump is being operated by the dispenser, and an isolation circuit to convert an AC input from the AC voltage sensing circuit to DC and to isolate the AC voltage sensing circuit from the microprocessor circuit; and,
   (d) generating a logic level when the pump is "on" and another logic level when the dispensing switch is "off" as an input to the microprocessor circuit.

9. The method as recited in claim 8, further comprising the step of: (e) providing an inhibit circuit for preventing operation of a product dispensing pump by the controller during a programmed test sequence by another system.

10. The method as recited in claim 9, further comprising the step of (f) providing a visual verification circuit for displaying the operational status of the programmable pump controller.

11. The method as recited in claim 8 wherein the logic level generated when the pump is "on" is a high logic level and another logic level generated when the pump is "off" is a low logic level.

12. The method as recited in claim 8 wherein the pump sensing circuit is an AC voltage sensing circuit placed in parallel with the dispensing switch which provides AC to DC rectification.

13. The method as recited in claim 12 wherein the pump sensing circuit uses an opto-coupler to provide an intrinsically safe isolation from the dispensing switch and the pump relay circuit.

* * * * *